United States Patent [19]

Burkholder

[11] Patent Number: 5,052,891

[45] Date of Patent: Oct. 1, 1991

[54] CONNECTION FOR GAS TURBINE ENGINE ROTOR ELEMENTS

[75] Inventor: Philip S. Burkholder, Lizton, Ind.

[73] Assignee: General Motors Corporation, Detroit, Mich.

[21] Appl. No.: 492,009

[22] Filed: Mar. 12, 1990

[51] Int. Cl.⁵ .............................................. F01D 5/30
[52] U.S. Cl. .................... 416/198 A; 29/525; 29/525.1; 29/889.21; 403/337
[58] Field of Search ........... 416/198 R, 198 A, 204 R, 416/204 A; 403/337; 29/525, 525.1, 889.21

[56] References Cited

U.S. PATENT DOCUMENTS

| | | | |
|---|---|---|---|
| 2,764,266 | 9/1956 | Haworth | 403/22 |
| 3,447,822 | 6/1969 | King | 416/198 A |
| 3,597,110 | 8/1971 | Corsmeier | 416/198 |
| 3,688,371 | 9/1972 | Koff | 416/198 A |
| 4,088,422 | 5/1978 | Martin | 416/198 A |
| 4,684,320 | 8/1987 | Kunz | 403/337 |
| 4,804,288 | 2/1989 | Tiernan, Jr. | 403/337 |
| 4,822,204 | 4/1989 | Lindenthal | 403/337 |
| 4,844,694 | 7/1989 | Naudet | 416/198 |
| 4,901,523 | 2/1990 | Huelster | 416/198 A |
| 4,903,546 | 2/1990 | Quintille | 403/337 |

FOREIGN PATENT DOCUMENTS 668715  3/1952  United Kingdom .
794956  5/1958  United Kingdom .

Primary Examiner—John T. Kwon
Attorney, Agent, or Firm—Saul Schwartz

[57] ABSTRACT

A connection between flanged elements of a gas turbine engine rotor. The connection includes a first annular flange on a first rotor element having a plurality of radially outwardly opening slots, an annular locking ring having a plurality of bolt holes, a second annular flange on a second rotor element, and a plurality of bolts each having a shank with a head at one end and a screw thread at the other end and a locking shoulder therebetween. The bolts are installed radially in the slots so that minimum clearance is required behind the first annular flange. The locking ring fits over the bolt shanks and is press fitted onto the locking shoulders of the bolts so that radial and axial dislodgment of the bolts from the slots is foreclosed. The second annular flange is fitted over the bolt shanks and nuts are screwed onto the bolts to retain the second annular flange. A flat surface on each bolt head is closely adjacent a wall of the first rotor element to prevent the bolts from rotating when the nuts are tightened.

4 Claims, 1 Drawing Sheet

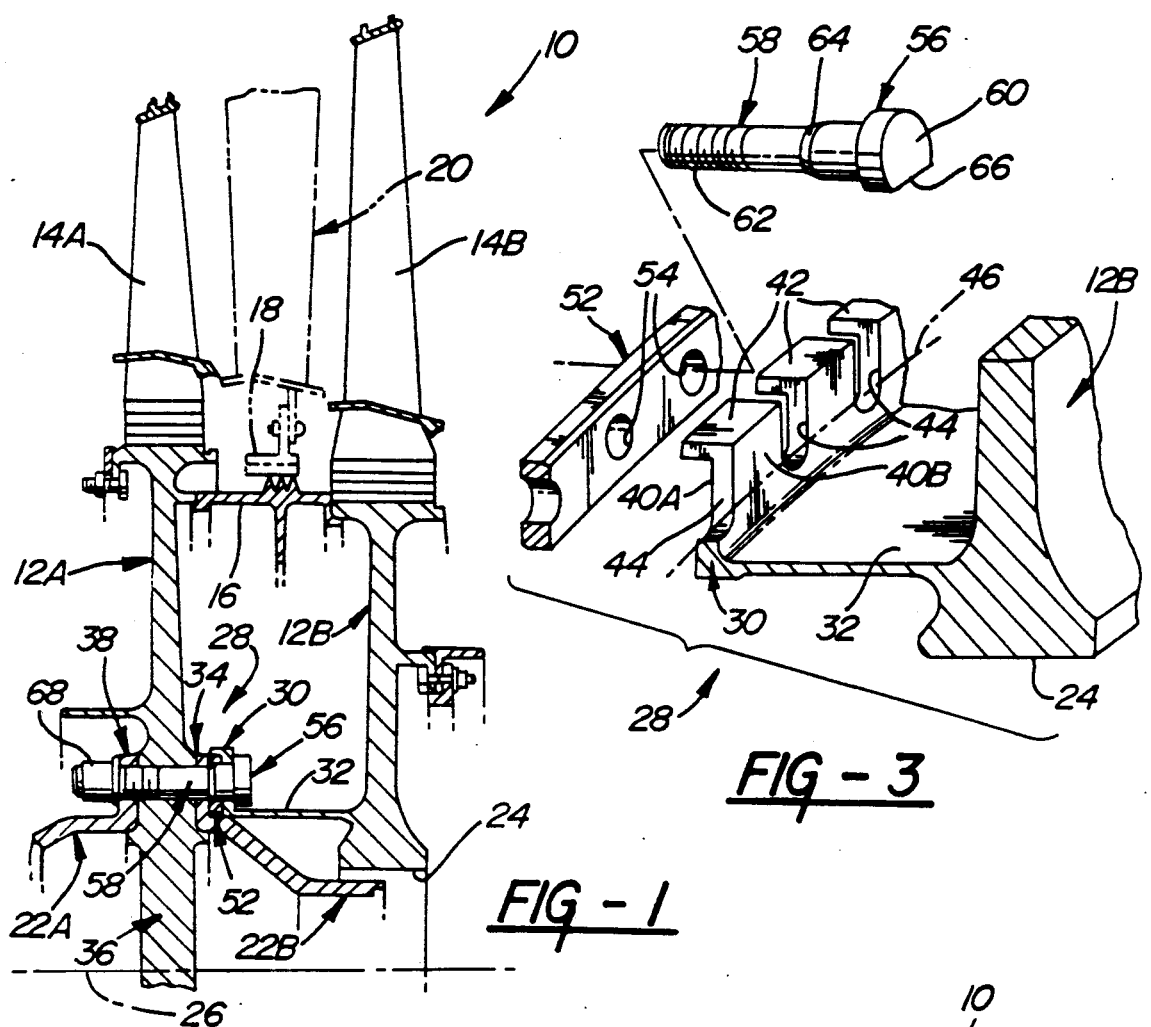
FIG-1
FIG-3
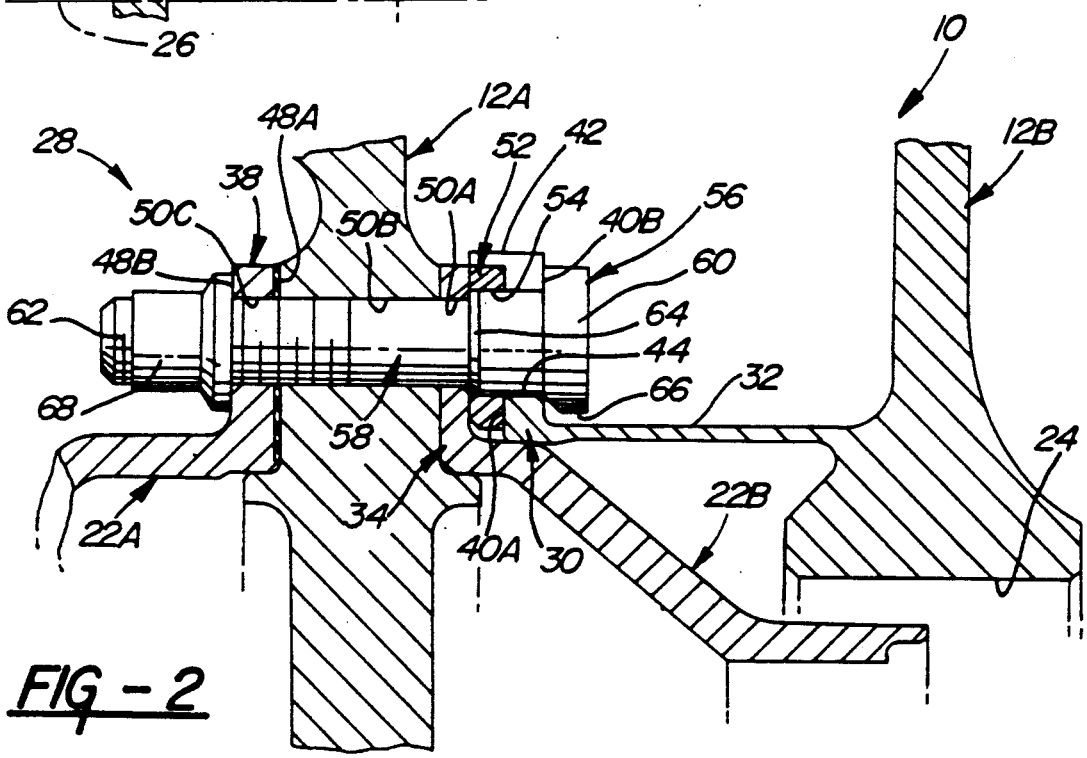
FIG-2

CONNECTION FOR GAS TURBINE ENGINE ROTOR ELEMENTS

FIELD OF THE INVENTION

This invention relates to bolted connections between gas turbine engine rotor elements having annular flanges.

BACKGROUND OF THE INVENTION

In gas turbine engines, multistage compressor and turbine rotors typically include two or more discs bolted together in axially spaced relationship. Where the heads of the attaching bolts are not readily accessible after the discs are stacked together, the bolts are made self-retaining in a first of the members while a second is joined with it. The bolts are also made self-locking against rotation so that nuts can be tightened on the bolts to complete the connection. A common practice is to provide the bolts with locking shoulders near the bolt heads and to interference press fit the locking shoulders into holes in a flange of the first member from the back side of the flange. The press fit holds the bolts on the first member while the second member is joined to it. Typically, a flat on the bolt head is located in close proximity to a surface of the first member to prevent bolt rotation when a nut is tightened onto it. This arrangement requires clearance behind the flange on the first member at least equal to the lengths of the bolts. An arrangement not requiring as much clearance behind the flange includes a plurality of spindles each having an enlarged, non-cylindrical mid-region between threaded ends. The mid-region of each spindle fits in a socket in the first member from the front side of the flange and is fastened to the flange by a nut on the back side of the flange. The flange of the second member is then installed on the exposed threaded ends of the spindles and another set of nuts is threaded on the exposed threads to complete the connection. A connection according to this invention is an alternative minimum-clearance connection between annular flanges on gas turbine engine rotor elements.

SUMMARY OF THE INVENTION

This invention is a new and improved connection between annular flanges on gas turbine engine rotor elements. The connection according to this invention includes a plurality of attaching bolts each having a shank with a bolt head at one end and a screw thread at the other end and a locking shoulder between the bolt head and the thread, a corresponding plurality of outwardly opening slots spaced around a first annular flange on a first rotor element, a locking ring with a corresponding plurality of bolt holes spaced at the same angular intervals as the bolt slots, and a corresponding plurality of bolt holes in a second annular flange on a second rotor element spaced at the same angular intervals as the bolt slots in the first flange and the bolt holes in the locking ring. The bolts are installed radially in the bolt slots with the bolt heads butting against the back side of the first annular flange. Because the bolts are inserted in the slots radially, the clearance behind the first annular flange may be less than the lengths of the bolts. The locking ring is installed over the bolts with the locking shoulder on each bolt interference press fitted in a corresponding one of the bolt holes in the locking ring. The locking ring prevents radial and axial dislodgment of the bolts from the slots in the first flange. The second flange is installed over the bolts and butts against the locking ring. A nut is installed on the screw thread on each bolt and tightened to unite the first and second flanges with the lock ring captured therebetween. A flat on each bolt head engages a surface on the first rotor element to prevent rotation of the bolt as the corresponding nut is tightened.

BRIEF DESCRIPTION OF THE DRAWING

FIG. 1 is fragmentary sectional view of a gas turbine engine rotor incorporating a connection according to this invention taken generally along the longitudinal centerline of the rotor;

FIG. 2 is an enlarged view of a portion of FIG. 1 showing the connection according to this invention; and FIG. 3 is a fragmentary, exploded perspective view of a portion of the gas turbine engine rotor illustrated in FIG. 1.

DESCRIPTION OF A PREFERRED EMBODIMENT

Referring to FIG. 1, a fragmentarily illustrated two-stage power turbine rotor 10 of a gas turbine engine includes a pair of turbine discs 12A-B arranged, respectively, toward the forward or inlet end of the engine and the aft or exhaust end of the engine. A plurality of turbine blades 14A-B on the discs 12A-B define, respectively, a forward stage and an aft stage of turbine blades in an annular gas flow path, not shown, of the gas turbine engine. A cylindrical spacer 16 is disposed between the turbine discs near the bases of the blades 14A-B and cooperates with a stationary seal 18 on a stator vane stage 20 between the forward and aft turbine blade stages in preventing bypass of hot gas around the stator vanes in the stator vane stage.

The forward disc 12A is disposed between a pair of tubular shaft elements 22A-B of the rotor 10 arranged, respectively, toward the forward and aft ends of the engine. The aft shaft element 22B projects through a center hole 24 in the aft turbine disc 12B. The shaft elements are supported by bearings on the case, not shown, of the gas turbine engine for rotation about a longitudinal centerline 26 of the engine. The aft turbine disc 12B, the aft shaft element 22B, and the forward shaft element 22A are all rigidly united with the forward turbine disc 12A by a connection 28 according to this invention.

Referring to FIGS. 1-3, the connection 28 includes a stack of annular flanges consisting of a first annular flange 30 integral with a cylindrical flange 32 of the aft turbine disc, a second annular flange 34 integral with the aft shaft element 22B, a third annular flange 36 defined by an annular segment of the forward turbine disc 12A adjacent the second annular flange 34, and a fourth annular flange 38 integral with the forward shaft element 22A. All of the annular flanges 30, 34, 36, 38 are centered around the longitudinal centerline 26.

The first annular flange 30 includes a front side 40A and a back side 40B each in planes perpendicular to the longitudinal centerline, a lip 42 around the flange perpendicular to the front side 40A, and a plurality of radially outwardly opening bolt slots 44. The slots 44 are spaced at predetermined angular intervals around the annular flange 30. The bottoms of the bolt slots are located on a common bolt circle 46, FIG. 3.

The fourth annular flange 38 has a front side 48A facing toward the front side 40A of the first annular flange and a back side 48B. Each of the second, third and fourth annular flanges 34, 36, 38 has a plurality of bolt holes 50A, B, C, respectively, corresponding in number to the number of bolt slots 44 in the first annular flange, arrayed on bolt circles of the same diameter as bolt circle 46, and spaced at the same angular intervals as the bolt slots so that all of the bolt holes register with each other and with the slots 44 when the flanges are stacked as illustrated in FIGS. 1-2.

The connection 28 further includes an annular locking ring 52 adjacent the front side 40A of the first annular flanges 30 under the lip 42. The locking ring 52 has a plurality of bolt holes 54 therein equal in number to the number of bolt slots 44 and arrayed on a bolt circle having the same diameter as bolt circle 46. The bolt holes 54 are also spaced at the same angular intervals as the slots 44 so that the bolt holes 54 in the locking ring register with the bolt holes 50A, B, C and the slots 44.

As seen best in FIGS. 2-3, a plurality of bolts 56 of the connection 28 equal in number to the number of slots 44 each include a cylindrical shank 58 having a bolt head 60 at one end and a screw thread 62 at the other end. Each bolt 56 also includes an enlarged annular locking shoulder 64 between the bolt head and screw thread. Each bolt 56 seats at the bottom of a corresponding one of the slots 44 in the first annular flange 30 with the bolt head 60 thereof butting against back side 40B of the flange. Each bolt head 60 has a milled flat 66 closely adjacent the cylindrical flange 32 of the aft turbine disc 12B.

The locking shoulders 64 of the bolts 56 are received in corresponding ones of the bolt holes 54 in the locking ring 52 with a mild interference press fit and the locking ring 52 nests inside the lip 42 on the first annular flange 30. The shanks 58 of the bolts 56 on the opposite side of the locking shoulders 64 from the bolt heads 60 project through the registered bolt holes 50A, B, C. The screw thread 62 on each shank extends beyond the back side 48B of the fourth annular flange 38. Respective ones of a plurality of nuts 68 are threaded onto corresponding ones of the shanks 58 and tightened against the back side 48B of the fourth annular flange. The four annular flanges 30, 34, 36, 38 and the locking ring 52 are thus rigidly clamped between the bolt heads 60 and the nuts 68 whereby the turbine discs 12A-B and the shaft elements of the rotor 22A-B are joined for unitary rotation about the longitudinal centerline 26.

A typical assembly sequence of the connection 28 commences with radial insertion of the bolts 56 in the slots 44 with the bolt heads 60 butting against the back side 40B of the flange 30. The minimum clearance required between the flange 30 and the disc 12B is about the thickness of the bolt heads 60. Next, the locking ring 52 is turned so that the bolt holes 54 therein register with the bolt shanks 58 and advanced axially until it butts again the front side 40A of the first annular flange inside the lip 42. Concurrently, the locking shoulders 64 on the bolts achieve interference press fit in corresponding ones of the bolt holes 54 in the locking ring so that axial and radial dislodgment of the bolts from the first annular flange is foreclosed.

With the locking ring 52 holding the bolts 56 on the first annular flange 30, the remaining flanges 34, 36, 38 are turned to achieve registry of all of the bolt holes and then advanced axially toward the first annular flange until the stack is complete. The nuts 68 are thereafter threaded on the bolt shanks 58 and tightened. The close proximity of the flats 66 on the bolt heads 60 to the cylindrical flange 32 on the aft turbine disc prevents the bolts from rotating with the nuts. If, after repeated assembly/disassembly sequences associated with field service of the rotor 10, the bolt holes 54 in the locking ring become enlarged, the worn locking ring is replaced by a new locking ring.

The embodiments of the invention in which an exclusive property or privilege is claimed are defined as follows:

1. A connection between a first rotor element including a first annular flange having a back side and a second rotor element including a second annular flange having a back side comprising:
    means defining a plurality of radially outwardly opening bolt slots in said first annular flange spaced at predetermined angular intervals around said first annular flange,
    a plurality of bolts each having a shank with a bolt head at a first end and a screw thread at a second end and a locking shoulder therebetween,
        said bolts being received in corresponding ones of said bolt slots with said bolt heads thereof butting against said back side of said first annular flange,
    an annular locking ring having a plurality of bolt holes therein spaced therearound at said predetermined angular intervals and receiving in interference press fit corresponding ones of said locking shoulders on said bolts thereby to foreclose radial and axial dislodgment of said bolts said bolt slots,
    means defining a plurality of bolt holes in said second annular flange spaced therearound at said predetermined angular intervals and receiving therethrough corresponding ones of said bolt shanks; and
    a plurality of nuts screwed onto corresponding ones of said bolt shank screw threads outboard of said back side of said second annular flange thereby to clamp together said first and said second annular flanges with said locking ring captured therebetween.

2. The connection recited in claim 1 and further including
    means on each of said bolt heads and on said first rotor element operative to positively foreclose rotation of said bolts relative to said first rotor element.

3. The connection recited in claim 2 wherein said means on each of said bolt heads and on said first rotor element operative to positively foreclose rotation of said bolts relative to said first rotor element includes
    means on each of said bolt heads defining a flat surface, and
    means on said first rotor element defining a wall closely adjacent said flat surface on each of said bolt heads.

4. A method of making a connection between a first rotor element including a first annular flange having a back side and a second rotor element including a second annular flange having a back side comprising the steps of:
    forming on said first annular flange a plurality of radially outwardly opening bolt slots spaced at predetermined angular intervals around said first annular flange, forming a plurality of bolts each having a shank with a bolt head at a first end and a screw thread at a second end and a locking shoulder therebetween, installing said bolts on said first annular flange by radially inserting said bolts into corresponding ones of said bolt slots with said bolt heads thereof butting against said back side of said first annular flange, forming an annular locking ring having a plurality of bolt holes therein spaced therearound at said predetermined angular intervals, installing said locking ring on said bolts by interference press fitting said locking shoulders thereof in corresponding ones of said bolt holes in said locking ring thereby to foreclose radial and axial dislodgment of said bolts from said bolt slots, forming in said second annular flange a plurality of bolt holes spaced therearound at said predetermined angular intervals, installing said second annular flange on said bolts by inserting said bolt shanks through corresponding ones of said bolt holes in said second annular flange, and attaching a plurality of nuts to corresponding ones of said bolts outboard of said back side of said second annular flange by screwing said nuts onto corresponding ones of said bolt shank screw threads thereby to clamp together said first and said second annular flanges with said locking ring captured therebetween.

* * * * *